Aug. 13, 1929.  H. E. FOX  1,724,650
SYNCHRONOUS MOTOR CONTROL SYSTEM

Original Filed June 24, 1924

WITNESSES:
H. B. Funk

INVENTOR
Harold E. Fox.
BY
J. G. Foster
ATTORNEY

Patented Aug. 13, 1929.

1,724,650

UNITED STATES PATENT OFFICE.

HAROLD E. FOX, OF PITTSBURGH, PENNSYLVANIA, ASSIGNOR TO CENTRAL ELECTRIC TOOL COMPANY, A CORPORATION OF PENNSYLVANIA.

SYNCHRONOUS-MOTOR-CONTROL SYSTEM.

Application filed June 24, 1924, Serial No. 721,989. Renewed June 3, 1929.

This invention relates to electrical control systems and particularly to systems for controlling synchronous devices.

One object of my invention is to provide a system for synchronizing a mechanical commutator or switch and an electrical rectifier in an electric circuit.

Another object of my invention is to provide a control system whereby correspondence between predetermined electrical and mechanical conditions may be established in a synchronous motor, to synchronize a commutating device driven by the motor with an electric valve energized from the motor circuit.

Another object of my invention is to provide a system for effecting the development of a predetermined polarity in a magnetic pole structure of a synchronous motor.

The ordinary synchronous motor of relatively small capacity of the order of one H. P. or under is usually of the type known as a synchronous induction motor. Such a motor is provided with a stator or stationary element embodying windings that are energized directly from a source of alternating current. The rotor element of the motor comprises a magnetic structure provided with slots within which current conductors are disposed to constitute what is known as a squirrel cage winding of the type ordinarily employed in induction motors. The rotor structure is also provided with salient portions which are influenced by the squirrel cage winding to assume one or another magnetic polarity, that is, to become either a south magnetic pole or a north magnetic pole.

A starting winding is usually provided which cooperates with the main motor winding to produce a rotating field to start the motor. When the motor attains a predetermined speed, a centrifugal switch mechanism opens the circuit of the auxiliary starting winding, after which the main winding maintains the motor in operation.

In ordinary applications in which a synchronous motor is used, it is immaterial whether the polarity that is developed in the rotor pole structures be of one sign or another. The only matter of interest involved is that the motor rotate in a predetermined direction. In applying a synchronous motor to several novel applications, however, involving rectification of alternating current and selection of current impulses of predetermined polarity, I have found it necessary to establish a predetermined correspondence between the electrical and mechanical relations of the motor, that is, a predetermined polarity in one of the pole elements disposed at a predetermined position on the shaft of the rotor.

One specific application in which I have employed a synchronous motor so controlled, is the alternate energization of the windings of a reciprocating motor provided with two operating windings.

In a co-pending application of Carl S. Weyandt, Serial No. 693,013, filed February 15, 1924, relating to methods of and means for controlling reciprocating motors, there is described and claimed a system for obtaining low speed operation in a reciprocating motor by alternately transmitting a current impulse to each winding of the reciprocating motor through an electric valve. A motor driven transfer switch is employed in that system for transferring the connections between the valve and the respective windings during intervals when no current traverses the valve. All arcing between contact surfaces and the necessity for care, attention and replacements are thereby obviated.

The present invention relates to a method of and means for controlling the synchronous motor to place the commutator transfer switch in proper conductive relation with the electric valve when the latter is rendered conductive by the proper circuit polarity. This I accomplish by causing a predetermined pole of the rotor structure to assume a predetermined polarity. That pole will follow the rotating field established by current in the stator windings of the motor, and will always traverse a definite portion of its path during a predetermined circuit polarity. The commutating transfer switch controlled by the motor will also, therefore, traverse a definite portion of its path for the duration of a definite polarity in the circuit, and may be connected in proper circuit relation with the valve to conduct current when the valve is rendered conductive.

The function of the transfer switch is to transmit current impulses of predetermined polarity at predetermined times through different paths or translating devices. Inasmuch as it must transmit the current impulses selected by the electric valve or rectifier, they must both be synchronized to transmit the selected impulses.

In practicing my invention to control the development of the predetermined polarity in the predetermined portion of the rotor, I employ an asymmetrical conductor or a uni-directional current conducting device, such as an electric valve of the electronic type, and dispose it to cooperate with a commutating device on the shaft of the motor to control the circuit of the motor to cause the motor to slip a pole when the polarity of the predetermined portion of the motor is opposite to that desired.

By developing a predetermined polarity in a definite part of the rotor structure, the rotor will be caused to always assume the same position at a definite polarity of the circuit. The position of the rotor, and, consequently, of the shaft, will always be the same when the circuit has a predetermined polarity. Such a condition will be obtained, of course, only in a two-pole motor. When a motor is employed that has a greater number of poles, that is, more than one pair of poles, a pole of one polarity might occupy as many different positions as there are poles. In such a case, the commutating device is provided with as many control elements or segments as there are pairs of poles. The motor may then be controlled to effect the development of a predetermined polarity in a definite pole of each pair. Such poles will traverse predetermined portions of their paths of travel during definite circuit polarity and maintain the commutating device in proper circuit relation with the valve.

Fig. 1 of the accompanying drawings is a longitudinal view, partially in section and partially in elevation, of an electric percussive tool or electric hammer of the reciprocating motor type;

Figure 1:
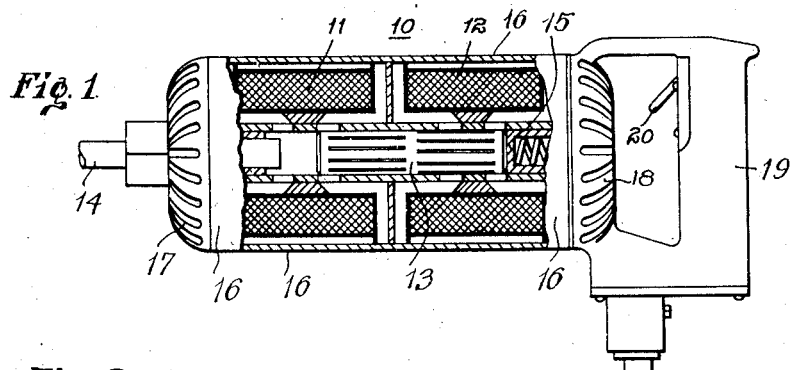

The electric hammer 10 that is illustrated in Fig. 1 comprises, in general, two solenoids or windings 11 and 12, a movable core 13 responsive thereto, a proper tool 14 upon which the core may operate to cause the tool to do useful work, a back stop 15 for storing the energy of the core upon its backward stroke, a casing 16 for enclosing the solenoids, a front cap 17 for enclosing the front end of the casing 16, and a rear cap 18 for enclosing the rear end of the casing 16. A handle 19 is integral with the rear casing 18 and contains a trigger switch 20 for controlling the operation of the hammer.

Figure 2:
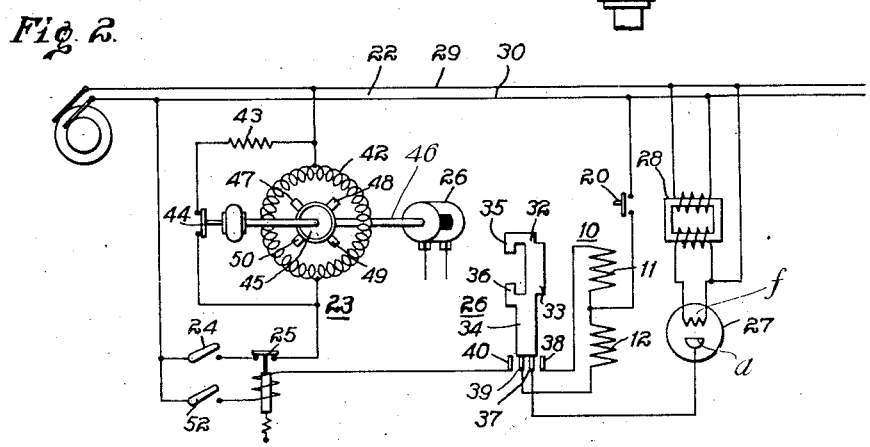
Fig. 2 is a diagrammatic view of an electric circuit in which the electric hammer of Fig. 1 is controlled in accordance with the pinciple of my invention.

In the system that is illustrated in Fig. 2, energy is derived from a single phase alternating current circuit 22 and is supplied to a synchronous motor 23 of the synchronous induction type through a manually operable switch 24. The circuit of the motor also contains a normally closed spring-restrained electromagnetic switch 25 which is controlled when necessary to cause the motor to slip a pole if improper polarity be developed in the rotor pole elements.

The synchronous motor 23 drives a commutating transfer switch 26 to control the energization of the respective windings of the electric hammer 10 from the circuit 22 through an electric valve 27.

The valve 27 is of the electronic type embodying an electron-emitting element, such as a filament $f$, as its cathode, and an anode $a$. Energy for the filament of the valve 27 is derived from the circuit 22 through a transformer 28. The filament of the valve is connected to a conductor 29 of the circuit 22 and when that conductor is negative with respect to the other conductor 30, the valve 27 is conductive and will transmit current.

The commutating transfer switch which transfers the connections between the valve and the respective windings of the hammer, comprises a contacting segment embodying a continuous portion 32, a right hand portion 33, a left hand portion 34 and two auxiliary segments 35 and 36. Four brushes, 37, 38, 39 and 40 are disposed to engage the respective portions 32, 33 and 34, and the auxiliary segments 35 and 36.

The synchronous motor 23 is a four pole motor and is illustrated in simple form as comprising a main stator winding 42, an auxiliary stator winding 43 and a centrifugal switch 44 which opens the circuit of the auxiliary winding 43 when the motor attains predetermined speed. The rotor 45 is mounted on a shaft 46 and is schematically illustrated as comprising two pairs of magnetic pole elements respectively numbered 47, 48, 49 and 50.

Figure 5:
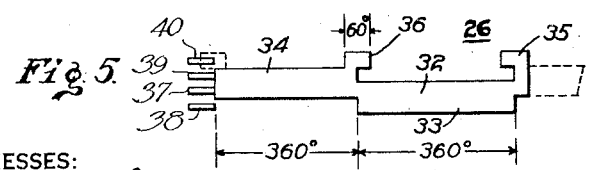
Fig. 5 is a development of a commutating transfer switch for controlling the connection between the valves and the windings of the reciprocating motor.

The transfer switch 26 is mounted on a shaft 46 and is driven by a synchronous motor at a speed corresponding to the frequency of the voltage of the supply circuit 22. The conducting portion of the switch 26 in practice is disposed in the surface of a cylinder 26 on the shaft 46. In Figs. 2 and 5 the conducting portion of the commutator or transfer switch is indicated at 26 as developed into a plane. Since the motor 23 is provided with two pairs of poles the transfer switch 26 is provided with two auxiliary segments 35 and 36 which constitute the control elements for controlling the development of predetermined polarities in the poles of the rotor. Since it has four poles, the motor will make one revolution in the time corresponding to two cycles. The transfer switch will correspondingly make one rotation in the same time.

Upon reference to the system illustrated in Fig. 2, it will be seen that the plate or anode $a$ of the valve 27 is connected to the continuous segment 32, through the brush 37 of the transfer switch. The brush 38 is connected to the winding 11 of the electric hammer and is adapted to engage the right hand segment 33. Similarly, the brush 39 is connected to one terminal of the winding 12 of the hammer and is adapted to engage the left hand segment 34. The brush 40 which is adapted to engage the auxiliary segments 35 and 36, is connected to one terminal of the operating coil of the electromagnetic switch 25, the other terminal of which is connected to the conductor 30 through a manually operable switch 52. The other terminals of the windings 11 and 12 of the electric hammer are adapted to be connected to the conductor 30 of the circuit 22 through the trigger switch 20.

Figure 3:
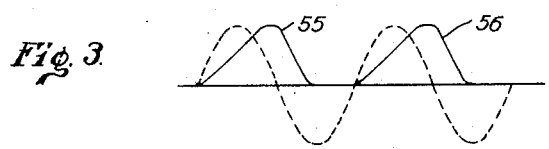
Fig. 3 is a graph illustrating two cycles of the alternating voltage wave and of the current impulses transmitted during those cycles to the electric hammer.

Upon reference to the graph in Fig. 3, it will be observed that the current impulse shown in solid line endures for an interval of the order of 270 electrical degrees. We have found that when current is supplied to an inductive device such as an electric hammer through an electric valve of the type here illustrated, that the current traversing the winding of the hammer involves an interval of approximately 270 degrees.

Since the motor makes one revolution in the time involved in two cycles of the supply current, the length of the continuous segment 32 is equivalent to 720 electrical degrees. The segment 33 and the segment 34 are equivalent to 360 electrical degrees in length, and the auxiliary segments 35 and 36 are made approximately 60 electrical degrees in length. As was previously mentioned, the filament $f$ of the valve 27 is connected to the conductor 29 and the valve will be conducted to transmit current when that conductor is negative and the conductor 30 is positive.

For the sake of simplifying the explanation of the present system, the voltage curve illustrated in dotted line in Fig. 3 may be taken as the polarity of the conductor 30 relative to conductor 29. When the conductor 30 is positive, the valve 27 is conductive and will transmit the energy impulse illustrated by the full line current wave 55. Assuming the transfer switch to be in proper step or position with respect to the alternations of the supply circuit, current will be transmitted from conductor 30 to conductor 29 through the valve 27, brush 37, segment 32, segment 34, brush 39, the solenoid 12 of the electric hammer and the trigger switch 20. The solenoid 12 will thereupon be energized to actuate the core member 13 in a backward direction, by a current impulse illustrated by curve 55 in Fig. 3.

During the interval between the current wave 55 and the next positive voltage wave, neither solenoid 11 or 12 will be energized. At the beginning of the second cycle that is illustrated, the conductor 30 will again be positive and the valve 27 will again be conductive to transmit current. At that time the brush 39 is disengaged from the segment 34 and the circuit of solenoid 12 is open. The circuit of the solenoid 11, however, is closed since the brush 38 is engaging the segment 33, and the current transmitted by the valve 27, illustrated in Fig. 3 by the full line wave 56, is transmitted to energize the solenoid 11. The core 13 is thereupon actuated in a forward direction to strike the tool 14 to cause it to do useful work. As the motor continues to rotate, the valve 27 is alternately connected to the solenoids 11 and 12 of the electric hammer and the core 13 is reciprocated back and forth between the tool 14 and the back stop 15 to cause the tool to do useful work.

The operation of the system has so far been considered during normal condition when the transfer switch is in proper step relation with the conducting periods of the valve. The operation of the system will now be considered during abnormal conditions, that is, when the motor is accelerated to synchronous speed in such manner that the transfer switch is not in proper circuit relationship with the valve.

When the synchronous motor is started upon closure of the switch 24, the main winding 42 and auxiliary winding 43 will establish a rotating field to accelerate the rotor to substantially synchronous speed whereupon the centrifugal switch 44 will operate to open the circuit of the auxiliary winding. The polarity that will be developed in the salient pole elements of the rotor will depend upon the position that the rotor occupies and upon the polarity of the circuit 22 at the instant the switch 24 is closed. If a predetermined pole of the rotor, for example pole 47, were always in a predetermined position when the motor is started, and the switch 24 were always closed when the conductor 30 is positive, the same polarity would be developed in the rotor pole 47. The position of the rotor, however, is not controlled, in any way, but depends upon the previous operation of the motor. Moreover, the manually operable switch 24 is not closed at any definite circuit polarity but may be closed at either polarity. The polarity that will develop in the pole 47 may therefore be the opposite polarity just as often as it may be the polarity that is desired. By means of the present system, however, improper polarity is reversed and the required polarity developed.

Figure 4:
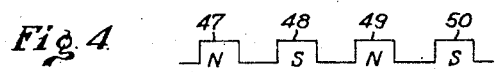
Fig. 4 is a development of the magnetic pole elements of the rotor of the synchronous motor.

The necessity of always developing the same polarity in the same rotor pole may be appreciated upon considering Figs. 3, 4 and 5. As was previously explained, in describing the operation of the system when conditions were proper and the system was operating normally, the segment 34 was in proper position to conduct the current impulses transmitted by the valve 27. Upon reference to Fig. 3, it becomes apparent that the mechanical disposition of the segment 34 had to correspond to the electrical disposition of the current impulse 55 in order that such impulse might be transmitted to the associated solenoid of the hammer. Under such conditions, it may be assumed that the pole elements of the rotor had the polarities as indicated in Fig. 4, namely, that the pole 47 was a north magnetic pole and that the other poles had the polarities indicated.

As was previously stated, a magnetic pole of definite polarity will occupy or traverse a definite portion of its path when the circuit has a predetermined polarity. Figs. 3 and 4 illustrate the electrical correspondence required for proper operation of the transfer switch, namely, that the pole 47 be a north pole in order that the commutating switch may be in proper position when the polarity of the conductor 30 is positive. If improper conditions be assumed, namely, that the pole 47 has become a south pole, it will occupy the position illustrated as occupied by the pole 48, that is, under the negative loop of the voltage wave. The effect is the same as though the voltage wave were shifted 180 degrees toward the right hand side. It becomes immediately apparent, upon reference to Figs. 3 and 5, that the current impulse that will be transmitted by the valve 27 will endure for an interval greater than that during which the brush 39 engages the segment 34 and, consequently, there will be considerable arcing between the brush and the segment as the inductive circuit of the hammer solenoid is ruptured thereby.

During normal operation no current is transferred between the auxiliary segments 35 and 36 and the brush 40. The reason therefor is apparent upon reference to Figs. 3 and 4, since the current wave reduces to zero value about 15 electrical degrees before either of the auxiliary segments is engaged by the brush 40. At that time the conductor 30 is negative and the valve 27 is nonconductive to transmit current to the transfer switch. During abnormal operation, however, the brush 40 engages the auxiliary segments 35 and 36 while the conductor 30 is positive and the valve 27 is conductive to transmit current. Current is consequently transmitted through the valve and an auxiliary segment of the transfer switch to the operating coil of the electromagnetic switch 25, which is thereupon actuated to momentarily open the circuit of the synchronous motor 23. If the switch 25 is maintained open for an interval of time corresponding to the time required for the passage of an odd number of voltage waves, the motor will be caused, upon the reclosure of the switch 25, to slip a pole and establish opposite polarities in the several pole elements of the rotor. The pole 47 will thereupon be caused to become a north magnetic pole. The required correspondence between the position of the transfer switch and the polarity of the circuit will thereby be attained and the motor and switch 26 will operate normally to transfer the connection of the valve 27 to the respective solenoids of the electric hammer during the intervals when the valve is conductive.

Although I have illustrated the commutating device as disposed in alinement with the pole structure of the rotor, such physical correspondence is not essential. Ordinarily, the rotor of the motor is so closed by the end-bells of the motor frame-work that it would be inconvenient to aline the commutating device with any degree of accuracy relative to the disposition of the pole elements of the rotor. It is not necessary, however, to obtain such accuracy of alinement. The commutating device may be placed on the shaft of the motor without regard to such alinement and it is only necessary to shift the brushes 38—40 with respect to the commutating device until the proper point is found at which actual correspondence is attained so that the brush 40 will engage the auxiliary contact segments 35 and 36 at positions corresponding to the electrical displacement illustrated relative to the voltage wave. Under such conditions, during normal operation, the brush 40 will engage the auxiliary segments when the valve is not conductive. Once the proper position for the brushes has been so determined, they may be permanently secured in such position.

For the sake of simplicity of explanation, I have considered a case where the predetermined polarity is developed in a portion of the rotor. The system is not necessarily so limited since the predetermined polarity may be developed in a similar manner in a portion of the stator structure in motors in which energy is supplied to windings on the rotor.

My invention thus comprehends the method of and means for establishing a predetermined magnetic polarity in a predetermined portion of a synchronous motor. Further, it comprehends a system wherein a selective switching device may be synchronized with an electric valve or other uni-directional current transmitting device in order that they may both be in proper circuit relation when the valve or uni-directional current transmitting device is conductive. The selective switching device may be a mechanical rectifier although the present system is not necessarily limited to such a device.

Modifications may be made in the present system without departing from the spirit and scope of the invention as set forth in the appended claims.

I claim as my invention:

1. The combination with a source of alternating current, a synchronous motor and means controlling connection between them, of means for causing the rotor of said motor to take a predetermined angular position with respect to half waves of current of one sign comprising means traversed by said current and controlling said connecting means only in response to a different angular position of said rotor with respect to said half waves of current of said one sign.

2. The combination with a source of alternating current, a synchronous motor and means controlling connection between them, of means for causing the rotor of said motor to take a predetermined angular position with respect to half waves of current of one sign comprising means controlling said connecting means temporarily to disconnect said motor from said source in response to a different angular position of said rotor with respect to said half waves of current of said one sign.

3. The combination with a source of alternating current, a synchronous motor and means controlling connection between them, of means for causing the rotor of said motor to take a predetermined angular position with respect to half waves of current of one sign comprising means in a circuit separate from the circuit of said motor controlling said connecting means in response to a different angular position of said rotor with respect to said half waves of current of said one sign.

4. In an alternating current circuit, the combination with a synchronous electric machine to be energized therefrom, of means for controlling the rotor of said machine to effect the development of a predetermined polarity in a predetermined portion of the machine, comprising an element responsive to the position of the rotor of the machine and an element responsive to the polarity of the circuit, said elements traversed by current from said circuit, and means controlled by said elements for controlling the energization of the motor.

5. In an alternating current circuit, the combination with a synchronous electric machine to be energized therefrom, of means for controlling the machine to effect the development of a predetermined polarity in a predetermined portion of the machine, comprising a commutator in a circuit independent of the motor and driven by the motor and an electric valve responsive to the polarity of the independent circuit.

6. In an alternating current circuit, the combination with a synchronous electric machine and a switch through which it is energized therefrom, of means for controlling the machine to effect the development of a predetermined polarity in a predetermined portion of the machine, comprising a commutator driven by the motor and an electric valve responsive to the polarity of the circuit, and a magnet winding connected in circuit with the valve through the commutator for actuating said switch.

7. In an alternating current circuit the combination with a synchronous machine to be connected thereto, of a manually operable switch for connecting the machine to the circuit, a magnetically operable switch in series therewith, and means for controlling the latter switch comprising a commutator device driven by the machine and means responsive to the polarity of the circuit, said commutator device and polarity responsive means traversed by current from said circuit.

8. In an electric circuit the combination with a synchronous machine to be connected thereto, a magnetically operable switch, and means for controlling the switch comprising a commutator device driven by the machine, and an electric valve connected to the circuit.

9. The combination with a source of alternating current, a synchronous motor, and a switch controlling connection of said motor to said source, of an asymmetric conductor in circuit with said source, switching mechanism driven by said motor included in circuit with said asymmetric conductor and comprising a plurality of contacts, a translating device controlled by one of said contacts, and means controlling said switch controlled by another of said contacts.

10. The combination with a source of alternating current, a synchronous motor, and a switch controlling connection of said motor to said source, of means in circuit with said source for suppressing current waves of one sign, switching mechanism driven by said motor in circuit with said means and comprising long and short contacts, a translating device controlled by a long contact, and means controlling said switch controlled by a short contact.

11. In an electric circuit the combination with a synchronous machine to be connected thereto, of a manually operable switch for connecting the machine to the circuit, a normally closed magnetically operable switch in series therewith, and means for causing the latter switch to open comprising means responsive to the polarity of a terminal of the machine and means responsive to the position of the rotor of the machine.

12. The combination with an alternating current circuit and a synchronous induction motor to be connected thereto, of means for controlling the development of a predetermined polarity in a predetermined portion of the rotor of the motor, comprising a commutating device driven by the motor and provided with a contact section corresponding to said predetermined portion of the rotor, a brush for engaging said section, an electric valve connected to the circuit, and a winding connected to the brush and the circuit to be energized through the valve if the valve is conductive when the brush engages said contact segment.

13. The combination with an alternating current circuit and a synchronous induction motor, of an electromagnetic switch connected between the circuit and the motor, means responsive to the circuit polarity, and separate means dependent upon the position of the rotor of the motor cooperating with the polarity-responsive means for transmitting current from said circuit upon predetermined relation between said means to control the operation of the electromagnetic switch.

14. In an alternating current circuit, the combination with a synchronous induction motor and means for connecting the motor to the circuit, of means conductive when a terminal of the motor bears a predetermined polarity, a switching device actuated by the motor, and means operative to control the connection between the circuit and the motor when the switching device is closed during the interval when the polarity-responsive means is conductive.

15. In an alternating current circuit, the combination with a synchronous induction motor and means for connecting the motor to the circuit, of an electric valve connected to the circuit and rendered conductive when a terminal of the motor bears a predetermined polarity, a switching device disposed in circuit with the valve and controlled by the motor, and means for controlling the motor circuit to cause the motor to slip a pole when a predetermined electrical relation obtains in the circuit including the switching device and the valve.

16. In an alternating current circuit, the combination with a synchronous induction motor and means for connecting the motor to the circuit, of an electric valve connected to the circuit and rendered conductive when a terminal of the motor bears a predetermined polarity, a switching device disposed in circuit with the valve and controlled by the motor, and electro-responsive means adapted to be controlled through the valve and the switching device to cause the motor to slip a pole.

17. In an alternating current circuit, the combination with a synchronous induction motor to be energized therefrom, of connecting means therebetween, and means controlled by current from said circuit in a path independent of said motor for controlling said connecting means to cause the motor to slip a pole.

18. In an alternating current circuit, the combination with a synchronous induction motor to be energized therefrom, of connecting means therebetween, and means comprising a commutating switch driven by the motor for controlling the connecting means to cause the motor to slip a pole.

19. The combination with an alternating current circuit, of a synchronous induction motor to be energized therefrom, connecting means therebetween, and means comprising an asymmetric conductor connected to the circuit for controlling the connecting means to cause the motor to slip a pole.

20. In an alternating current circuit the combination with a synchronous induction motor to be energized therefrom, of connecting means therebetween, and means comprising a commutating switch driven by the motor and an electric valve connected to the motor circuit for controlling the connecting means to cause the motor to slip a pole.

21. In combination, a source of alternating current, a synchronous motor, a circuit connecting the motor to the source, a magnet switch in said circuit, and a second circuit for controlling the energization of the magnet comprising an electric valve and a switch controlled by the motor.

22. In combination, an alternating current circuit, a synchronous motor, a commutator controlled by the motor comprising a main segment, an auxiliary segment, a brush for continuously engaging the main segment and a brush for periodically engaging the auxiliary segment, an electric valve connected between the main segment brush and one conductor of the circuit, and means connected between the auxiliary segment brush and the other conductor of the circuit for controlling the connection of the motor to the circuit.

23. In an alternating current circuit, the combination comprising a rectifying tube, a commutating device for controlling the circuit thereof, a synchronous motor controlling the commutating device, and means for controlling the motor to place the commutator in predetermined circuit relation with the tube when current of predetermined polarity tends to traverse the tube.

24. In combination, a source of alternating current, an electric valve connected thereto, a commutating device, means for operating the device in synchronism with current from said source, and means connected in circuit with the commutating device and the valve for controlling the commutating device to establish a predetermined relation between said device and the valve depending upon the polarity of a terminal of the valve.

25. The combination with a source of alternating current, of a synchronous motor driven thereby, a switch driven by said motor, a rectifier in circuit with said switch and said source of current, and means for causing a change of speed of said motor controlled by current transmitted through said rectifier and switch when the rotor of said motor takes a predetermined angular position with respect to the half waves of current of one sign.

26. The combination with a source of alternating current, a synchronous motor, and a switch controlling connection of said motor to said source, of a rectifier, a switching mechanism in circuit with said rectifier and said source and driven by said motor, said switching mechanism comprising a plurality of contacts, a translating device controlled by one of said contacts and means controlled by another of said contacts for causing the rotor of the motor to take a predetermined step relation with respect to the impressed electro-motive force.

27. The combination with a source of alternating current, of a synchronous motor driven thereby, a synchronous switch, means for permitting passages through said switch of a current impulse in a predetermined direction, and means controlled by current traversing said means and said switch to ensure that the rotor of the motor shall be in predetermined step relation with respect to the impressed electro-motive-force.

28. The combination with a source of alternating current, of a synchronous motor driven thereby, a synchronous switch driven by said motor, an asymmetric electrical conductor permitting passage through said switch of current from said source in predetermined direction, and means controlled by current traversing said asymmetric conductor and said switch to ensure that the rotor of the motor shall be in predetermined step relation with respect to the impressed electro-motive-force.

29. In an alternating current circuit, the combination comprising an asymmetrical conductor, a commutating device for controlling the connection thereof to the circuit, operating means therefor, and means for controlling the commutating device to establish a predetermined electrical relationship between the conductor and the commutating device.

30. In an alternating current circuit, the combination comprising an asymmetrical conductor, a commutating device for controlling the connection thereof to the circuit, operating means therefor, and means for controlling the commutating device to establish a predetermined electrical relationship between the conductor and the commutating device, said controlling means comprising means responsive to a condition indicative of other than the desired relationship between the conductor and the commutating device.

31. In combination, a source of alternating current, a utilization circuit, a synchronous switch connected therebetween comprising a synchronous motor, and means controlled by current from said source for controlling the operation of the motor to cause the switch to transmit current impulses of predetermined polarity from the source to the utilization circuit.

32. In an alternating current circuit, the combination with a translating device, of a mechanical rectifier and an asymmetrical electric conductor for controlling the energization of said translating device from said alternating current circuit, and means associated with the mechanical rectifier for synchronizing it with respect to the current waves passed through said asymmetrical conductor.

In testimony whereof, I have hereunto subscribed my name this 16th day of June, 1924.

HAROLD E. FOX.